Figure 1:
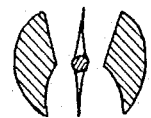

May 30, 1967 H. WESTERDAHL 3,321,801
APPARATUS FOR SEPARATING THE FLANK FLESH FROM THE RIBS
AND VERTEBRAL APPENDAGES OF A FISH
Filed March 18, 1965 3 Sheets-Sheet 1

INVENTOR.
H. Westerdahl
BY
Richards & Geier
ATTORNEYS

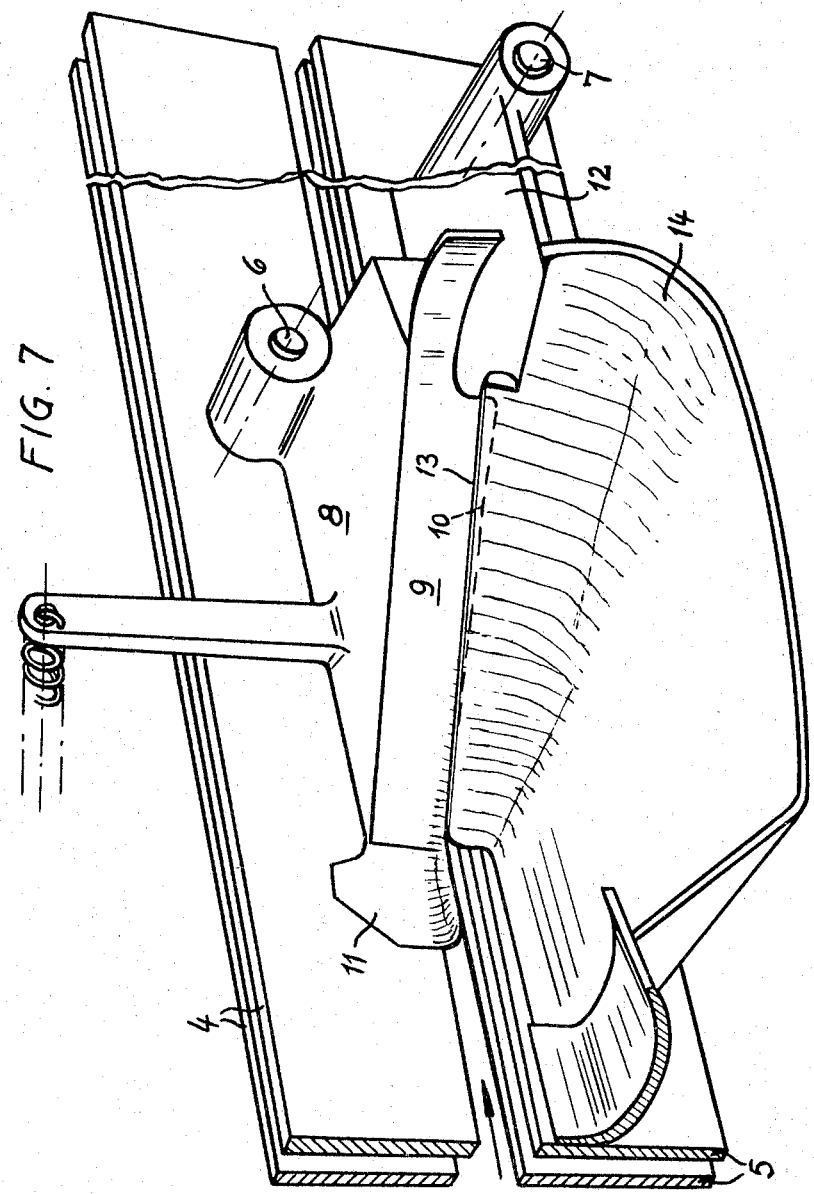

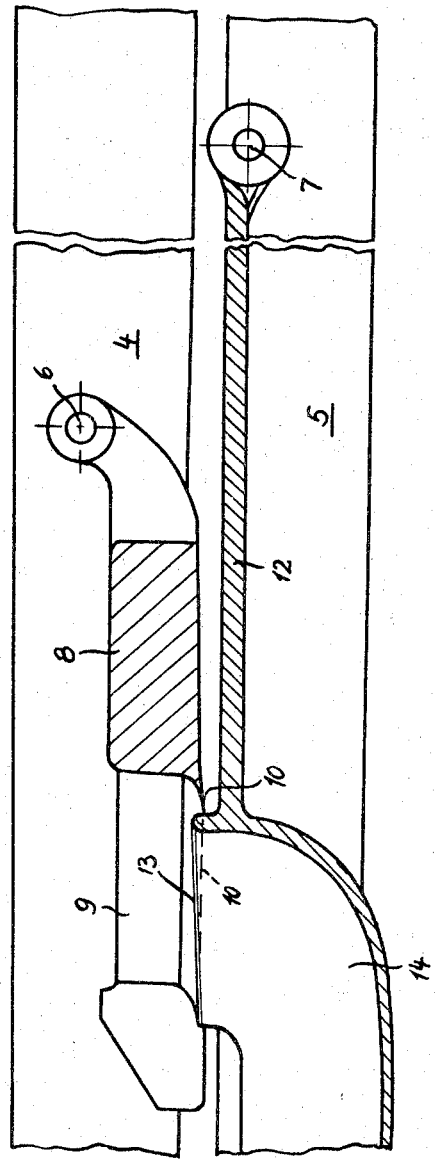

3,321,801
APPARATUS FOR SEPARATING THE FLANK FLESH FROM THE RIBS AND VERTEBRAL APPENDAGES OF A FISH

Henri Westerdahl, Ronne, Bornholm, Denmark, assignor to the firm Nordischer Maschinenbau Rud. Baader, Lubeck, Germany
Filed Mar. 18, 1965, Ser. No. 440,722
Claims priority, application Germany, Mar. 20, 1964, N 24,657
6 Claims. (Cl. 17—4)

The invention relates to an apparatus for separating the flank flesh from the ribs and vertebral appendages of a fish, the fillets of which are separated from the spike bones of the spine in the vicinity of the belly cavity and from the spine from the belly cavity to the root of the tail.

Devices are known with which the flank flesh is separated from the ribs and vertebral appendages as well as from the flank skin. The separation is effected either with the aid of stationary knives which carry out a more or less scraping operation or by rotary knives which are arranged horizontally or at an angle to each other. In both cases the cutting resistance occurring during the working of the tools causes difficulties, which it has hitherto not been possible to overcome even by using conveyor reinforcements, spiked belts and the like. Another objection is that there are no uniform cutting planes because, due to the curvature of the vertebral appendages, cutting surfaces are produced which are partly curved and partly flat. This results either in loss of fish flesh or in extremely complicated tool arrangements being necessary. Both of which are, however, undesirable and detrimental.

It has now been found that these disadvantages can be overcome if, according to the invention, the fish gripped by the dorsal vertebrae is pressed with its belly firmly against a support in such a manner that by flattening out the vertebral appendages and ribs each flank half forms a plane or level surface, from which the flank flesh is stripped off and the remaining flank skin scraped. Owing to the fact that each flank half now forms only one plane, it is possible to use the known scraping tool in the form of a one-sided wedge for each half, whereby the edge of the wedge carries out the stripping or scraping. Owing to the fact that the fish, due to the flattening of the vertebral appendages, lies flat on a level surface and is pressed firmly thereon, an effective conveyor reinforcement against the cutting resistances which occur is produced so that additional conveyor reinforcing means are not required in spite of the use of stationary knives.

Another advantage associated with the invention, is the possibility of turning over the fillet halves as they are carried away from the cutting tools after the flank flesh has been stripped and the flank skin scraped off, so that they rest on the skin and can immediately be skinned. Consequently the operation of turning over the fillet halves, otherwise necessary when feeding to the skinning device, is dispensed with.

The tool for carrying out the method is extremely simple. It consists of a longitudinally divided, heavily spring-loaded support and a longitudinally divided knife which is provided along the edges of the gap between the parts with upwardly extending flanks for engaging the dosal vertebrae and pressing the vertebral appendages firmly against the resilient support, whereby the cutting edges are arranged at an acute angle to each other. At the same time it is advantageous for the cutting edges ot be dulled at the places where only the flank skin has to be parted from the fish flesh.

To effect the turning of the fillets, the rear ends of the cutting tool are so shaped that the fillet halves swing over through 180° as they leave the tool.

The two halves of the resilient support and of the cutting tool can be arranged in the same plane but they can also be arranged in roof shape. A great advantage of the method according to the invention is that the known pushing saddles can be used as conveying means.

Figure 3:
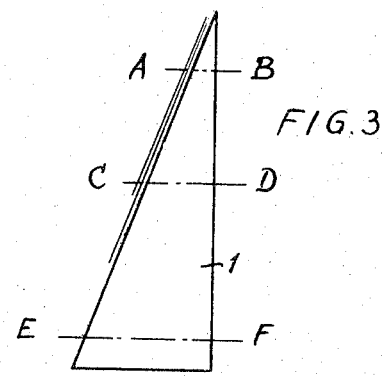
Figure 2:
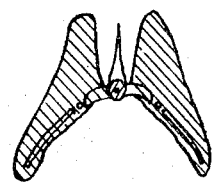
Figure 4:
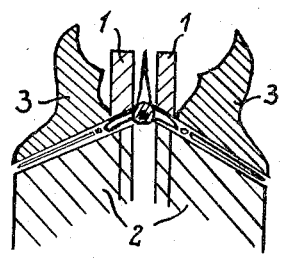
Figure 5:
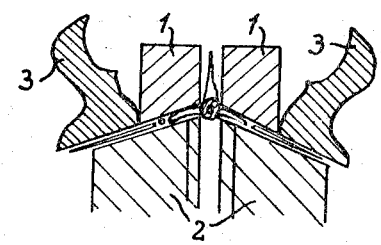
Figure 6:
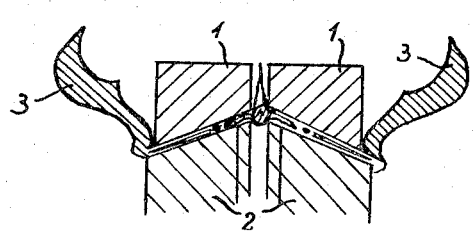

The method and the tool for carrying out the method are illustrated diagrammatically by way of example in the accompanying drawings, in which FIGS. 1 and 2 show the preparation of the fish;
FIG. 3 is a plan view of one half of the tool;
FIGS. 4 to 6 show phases of the method taken on lines A–B, C–D, and E–F of FIG. 3 respectively;
FIG. 7 is a perspective view of the tool arrangement, and
FIG. 8 a vertical section through the tool.

Before the flank flesh is separated, the fillets are stripped in known manner off the spine from the end of the belly cavity to the root of the tail, as shown in FIG. 1, and from the spikes of the dorsal vertebrae in the region of the belly cavity, as shown in FIG. 2. Then the flank flesh is stripped from the spine towards the sides and the flank skin scraped off, as shown in FIGS. 4 to 6. In these figures the parts of the knife 1 and the parts of the resilient support 2 are illustrated only diagrammatically in the form of blocks. It can be seen that the fish engaged at the dosal vertebrae is pressed firmly against the resilient support so that the vertebral appendages and ribs are flattened out and each fillet forms a plane or flat surface. It can also be seen that the fillet halves 3 tip over during the stripping of the flank flesh and scraping off of the flank skin, that is are turned over so that at the end of the operation they are carried off resting on the skin and can be fed to the skinning stage in this position.

FIGS. 7 and 8 show a tool arrangement such as can be used by preference. For guiding the skeleton four guide rails 4 and 5 are arranged at distances apart, two (4) and two (5) below, the upper rails 4 being pivotable about an axle 6 and the lower rails 5 slightly resilient about an axle 7. The upper guide rails 4 carry the cutting tools 8 which consist of a wedge-shaped block having on its downwardly pointing wedge-shaped edge 9 a cutting edge 10. The upright side of the wedge allows the fillet halves to rise and fold over outwards.

The cutting tool 8 is also pivotable about the axle 6 and forms a unit with the coordinate guide rails 4. The side of the wedge 9 terminates at the guide rail 4 in an upright part 11 extending parallel to the guide rail 4, which part, on the one hand, presses down the ribs and, on the other hand, guides the flank portion of the fish to the cutting edge 10.

One each of the lower guide rails 5, a resilient support 12 for the spread flank portion of the fish is pivotable about the axle 7 and forms a unit with its respective rail 5. This support comprises a bead-like edge 13 extending at an incline to the cutting edge 10 in such a manner that, when the parts 8 and 12 are pressed apart by the oncoming fish, the cutting gap first opens in the region of the ribs and vertebrae appendages and gradually drifts outwards so that, at the end of the tool a cutting gap is produced which is widest at the guide rail and narrowest at the outer side and thus corresponds to the cross-section of the flank portion from the backbone to the outer edge.

In front of the bead 13 the part 12 is constructed as a rounded trough 14 which, cooperating with the wedge-shaped edge 9, enables the fillet halves to run upwards from the dosal vertebrae towards the outer side with the result that they are tipped over as shown in FIGS. 4 to 6 and turned so that they are carried off resting on the skin and can be fed to the skinning machine in this position.

By the term "stripping off" is understood the penetration of the cutting tool between the skin covering the ribs and the vertebral appendages and the skins covering the packets of flesh.

What I claim is:

1. A tool for separating the flank flesh of a fish, said tool comprising a first pair of parallel guide rails, a second pair of parallel guide rails coextensive with said first pair of guide rails and spaced therefrom, whereby a gap is located between the two pairs of guide rails, an axle extending through said first pair of guide rails, a second axle extending through said second pair of guide rails, a cutting tool pivotally mounted upon the first-mentioned axle and having a wedge-shaped portion providing a cutting edge and an upright guiding portion located adjacent one of said first pair of guide rails, said cutting edge being located substantially on the level of said gap, and a resilient support pivotally mounted upon said second axle and comprising a bead-like edge extending close and at an incline to said cutting edge and a rounded trough connected with said bead-like edge and cooperating with said wedge-shaped portion for tipping over fish fillets.

2. Tool according to claim 1, comprising a longitudinally divided spring loaded support and a longitudinally divided knife having a portion provided along the edges of its gap between the two parts for engaging the dorsal vertebrae and pressing the verterbral appendages against the resilient support, the cutting edges of the two parts of the longitudinally divided knife being arranged at an acute angle to each other.

3. Tool according to claim 2, wherein the cutting edges are dulled at the places where only the flank skin is to be separated from the fish flesh.

4. Tool according to claim 2, wherein the rear ends of the cutting tool are so shaped that the fillet halves turn over through an angle of 180° as they run off the cutting tool.

5. Tool according to claim 2, wherein the two halves of the resilient support and of the cutting tool are roof shaped.

6. Tool according to claim 2, wherein the cutting edge and the upper edge of the support extend at an incline to each other.

References Cited

UNITED STATES PATENTS

| 2,722,711 | 11/1955 | Savrda | 17—4 |
| 2,841,816 | 7/1958 | Westerdahl | 17—4 |
| 3,052,914 | 9/1962 | Luedtke | 17—7 |

FOREIGN PATENTS

| 141,659 | 6/1951 | Australia. |

LUCIE H. LAUDENSLAGER, *Primary Examiner.*

SAMUEL KOREN, *Examiner.*